Figure 1:
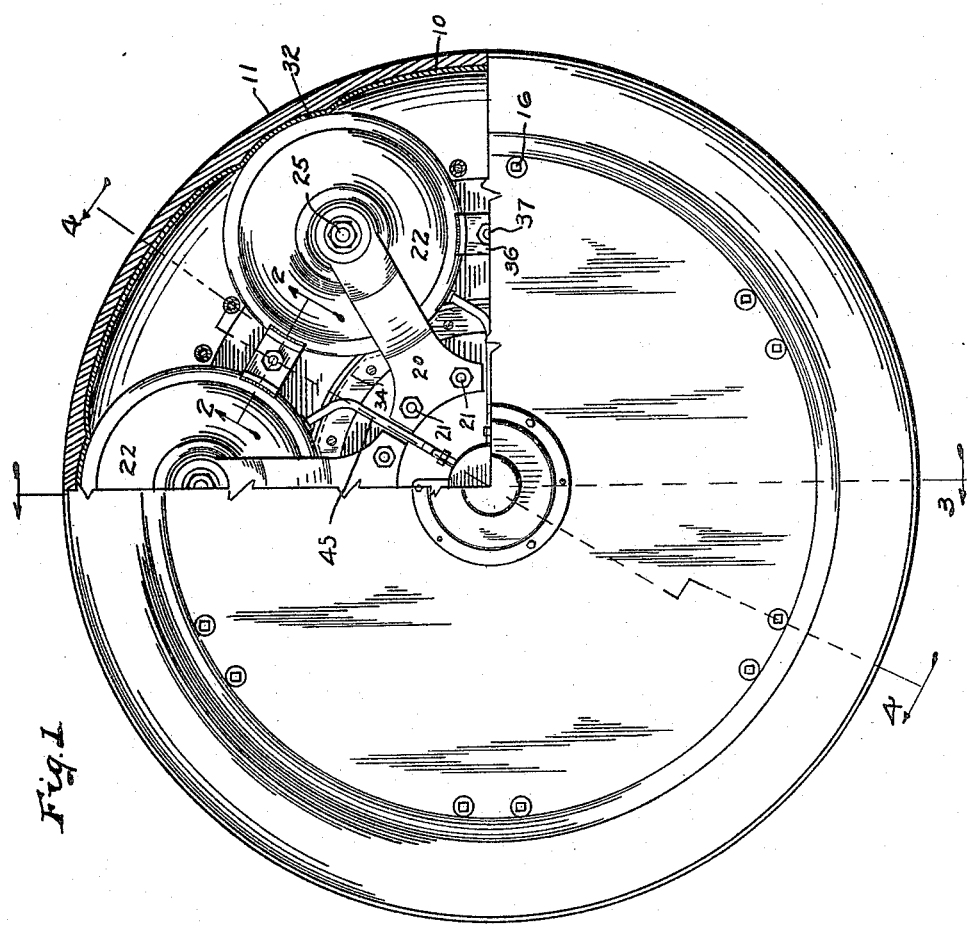

H. B. COATS.
VEHICLE WHEEL.
APPLICATION FILED MAR. 7, 1913.

1,193,455.

Patented Aug. 1, 1916.
2 SHEETS—SHEET 1.

WITNESSES:

INVENTOR
HENRY B. COATS.

BY
ATTORNEY

H. B. COATS.
VEHICLE WHEEL.
APPLICATION FILED MAR. 7, 1913.
1,193,455.
Patented Aug. 1, 1916.
2 SHEETS—SHEET 2.
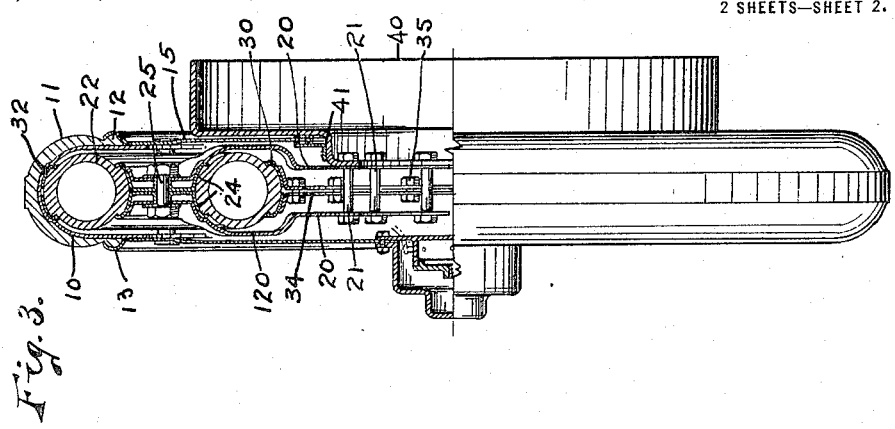
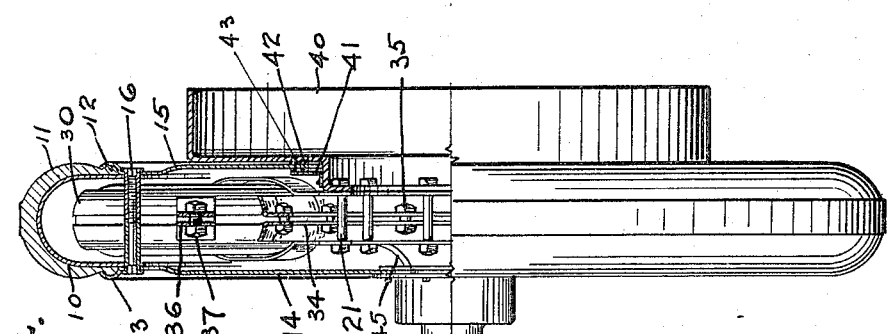
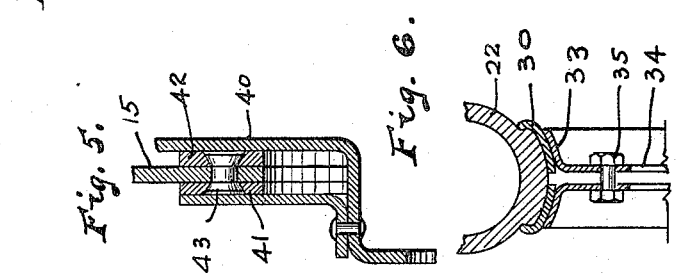
WITNESSES.
J. H. Swan
O. M. McLaughlin
INVENTOR
HENRY B. COATS
BY
V. H. Lockwood
ATTORNEY

UNITED STATES PATENT OFFICE.

HENRY B. COATS, OF VEEDERSBURG, INDIANA.

VEHICLE-WHEEL.

1,193,455.  Specification of Letters Patent.  Patented Aug. 1, 1916.

Application filed March 7, 1913. Serial No. 752,655.

*To all whom it may concern:*

Be it known that I, HENRY B. COATS, a citizen of the United States, and a resident of Veedersburg, county of Fountain, and State of Indiana, have invented a certain new and useful Vehicle-Wheel; and I do hereby declare that the following is a full, clear, and exact description thereof, reference being had to the accompanying drawings, in which like letters refer to like parts.

The object of this invention is to provide an improved construction of vehicle wheel which is resilient enough for automobile use and has an entirely puncture proof tire and is capable of standing up to the work which would be required in an automobile.

The chief feature of the invention consists in providing within the wheel a floating structure which carries the axle and load and which is supported by a plurality of pneumatic annular cushions located within the wheel, the inner portion of each annular cushion being clenched in an annular metal rim which is U-shaped in cross section and one of a series concentric with said rim and likewise concentric with a solid rubber tire surrounding said rim. A portion of the outer part of each annular cushion is embedded within the annular metal rim which is enveloped by the solid cushion tire, the inner edge of the solid cushion tire being on about the same level as the inner edge of each annular cushion. Therefore, the outer portion of each pneumatic annular cushion adjacent to the tire is located with reference to the solid rubber tire in substantially the same relation as the inner pneumatic tube is located with reference to the outer casing of the pneumatic tire. This causes the wheel to operate successfully and it overcomes the danger of lateral thrust or strain as when an automobile turns a corner under speed.

Another feature of the invention is that each annular cushion is provided with an external peripheral portion which is clenched by an annular clenching ring which is embedded in a recess in the annular metal rim so as to avoid lateral displacement of the parts of the tire of the wheel.

Another feature of the invention consists in forming the clenching ring of each pneumatic cushion of two annular side portions or halves and they are forced and held together by the recessed portion of the metal rim on the outer side of each annular cushion and by a pair of oppositely located clamping plates on the inner side and by a pair of oppositely located clamping braces at points about midway between the outer and inner sides of the annular cushion.

Another feature of the invention consists in the particular means for mounting the load so that it will be carried by the inner peripheries of the annular cushions. Another clencher rim is provided within each cushion which is held together by clamping portions of a pair of plates which supports the load.

Another feature of the invention consists in making a dust proof joint between the side plates and the movable parts of the wheel so that no dust can get therein.

Figure 2:
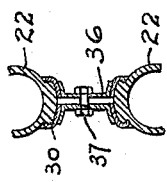

In the drawings, Figure 1 is a side elevation of the wheel with one fourth thereof in section. Fig. 2 is a section on the line 2—2 of Fig. 1. Fig. 3 is a front elevation of the wheel with part in section on the line 3—3 of Fig. 1. Fig. 4 is the same with section of a portion on the line 4—4 of Fig. 1. Fig. 5 is a radial section on a larger scale of a portion of the wheel through the joint between the inner and outer frames. Fig. 6 is a transverse section through a part of the inner portion of a cushion and the means for clenching it.

In detail the drawings herein show a wheel having a continuous annular metal rim 10 which is U-shaped in cross section and around it there is a solid rubber tire 11 which is substantially the shape of the outer casing of an ordinary pneumatic tire and it has beads 12 along its inner peripheries which are clamped by annular clenching portions 13 which are on the outer periphery of side plates 14 and 15. These side plates 14 and 15 are clamped or drawn together by bolts 16 which clamp the beads 12 of the rubber tire 11 tightly against the metal rim 10, whereby said parts are readily secured together.

Within the foregoing structure formed of the side casings and tire of the wheel, there is a floating frame which carries the load. Said floating frame consists of side bars 20 which extend radially of the hub and they are arranged in pairs, carrying bolts 21 at their inner ends which are adapted to be secured to the axle which is not here shown. Between the outer ends of each pair of bars 20 an annular pneumatic cushion 22 is mounted. To that end the inner periphery of each annular cushion 22 is thickened and the thickened portion thereof clenched by a pair of oppositely placed clenching plates 24 which lie between portions of the bars 20 and the latter are clamped against the clenching plates 24 by bolts 25. To that end the bars 20 are shaped, as shown in Fig. 3, so as to lie against the pair of clenching plates 24 and bear against them when drawn down by the bolt 25 so as to cause said plate 24 to clench and hold the inner peripheries of the pneumatic cushions.

The outer periphery of each pneumatic cushion is thickened to form a rib which is clenched by clencher rings 30 which are annular and surround the cushion 22. Said clencher rings 30 are embedded in a depression or recess at 32 in the annular metal rim 10 so that lateral thrust will not dislodge said parts. The inner portions of the clencher rings are clamped together by the curved ends 33 of a pair of annular plates 34 which are drawn together for clamping by bolts 35, as shown in Figs. 1 and 6. Said clencher rings 30 are also held in place and clamped on each side of each cushion 22 by intermediate braces 36 which have end flanges that partially envelop the rings 30 and are drawn together and clamped against said rings 30 by a bolt 37, see Fig. 2. Hence, each pair of clencher rings 30 are clamped and held in place at four points, see Fig. 1, whereby the periphery of each cushion is securely mounted and held. As seen in Fig. 3, the inner portion of the cushion 22 extends through and operates between widened portions of the bars 20, as at 120, so that radial play of the cushion is permitted without interference from the bars. There is a brake drum 40 secured by the bolts 21 and formed as shown in Fig. 5, and there is a plate 41 extending around the inner reduced portion of the brake drum so that said plate 41 and the brake drum overlap the side plate 15 and the joint between said plates is closed by felt strips 42 held in place by rivets 43 on the side plate 15. This makes the wheel dust proof so that dust cannot enter the interior thereof. The pneumatic cushions 22 are inflated through an air tube 45, see Fig. 1, which extends from said air tube to a point near the center of the wheel, whereby the same may be accessible for introducing air to the annular cushions. In operation the series of air cushions 22 coöperate for yieldingly supporting the load and floating inner frame within the outer casing or frame of the wheel so that all shock and jar will be taken up by the cushions.

I claim as my invention:

1. A vehicle wheel including a transversely curved rim, a central hub structure, and a plurality of pneumatic cushions for supporting said hub structure in said rim, the outer portions of said cushions being embedded in said rim so as to be substantially concentric transversely with the adjacent portions of the rim.

2. A vehicle wheel including an outer structure formed of side casings, a transversely curved tire rim and a transversely curved tire in said tire rim, a central hub structure, and a series of annular pneumatic cushions for supporting the hub structure within said external structure, the outer portion of each cushion being embedded in said rim so as to be substantially concentric transversely with the adjacent portions of the rim.

3. A vehicle wheel including an outer structure having a recessed tire rim, a central hub structure, a series of annular pneumatic cushions for supporting the hub structure within said external structure, and a clencher rim surrounding each cushion with its outer portion embedded in a part of the recesses in the tire rim.

In witness whereof, I have hereunto affixed my signature in the presence of the witnesses herein named.

HENRY B. COATS.

Witnesses:
J. H. WELLS,
O. M. McLAUGHLIN.

Copies of this patent may be obtained for five cents each, by addressing the "Commissioner of Patents, Washington, D. C."